United States Patent
Young

(10) Patent No.: US 6,460,676 B1
(45) Date of Patent: Oct. 8, 2002

(54) FRICTION CLUTCH WITH WEAR ADJUSTMENT AND CONSTANT LIFT DEVICE

(75) Inventor: Alastair John Young, Kenilworth (GB)

(73) Assignee: Automotive Products UK Limited, Leamington Spa (GB)

( * ) Notice: Subject to any disclaimer, the term of this patent is extended or adjusted under 35 U.S.C. 154(b) by 0 days.

(21) Appl. No.: 09/763,067
(22) PCT Filed: Aug. 2, 1999
(86) PCT No.: PCT/GB99/02534
§ 371 (c)(1), (2), (4) Date: Feb. 16, 2001
(87) PCT Pub. No.: WO00/11365
PCT Pub. Date: Mar. 2, 2000

(30) Foreign Application Priority Data

Aug. 20, 1998 (GB) .............................................. 9818074

(51) Int. Cl.[7] .............................................. F16D 13/75
(52) U.S. Cl. ................................ 192/70.25; 192/111 A
(58) Field of Search .......................... 192/70.25, 111 A

(56) References Cited

U.S. PATENT DOCUMENTS 6,325,192 B1 * 12/2001 Reik et al. ............... 192/70.25

FOREIGN PATENT DOCUMENTS

| DE | 197 03 333 A | * | 8/1988 |
| DE | 42 33 997 A | * | 12/1994 |
| WO | WO 98 41777 A | * | 9/1998 |

* cited by examiner

Primary Examiner—Saul Rodriquez
(74) Attorney, Agent, or Firm—Paul E Milliken; Ray L Weber

(57) ABSTRACT

A constant lift device for a friction clutch s comprises a lever (80) pivotally connected to the pressure plate (13) of the clutch. An abutment (82) on the lever contacts the clutch cover (21) during disengagement to limit the lift of the pressure plate (13). The pivotal position of the lever (80) relative to the pressure plate is controlled to maintain the lift of the pressure plate (13) substantially constant over the life of the clutch. The means for controlling the pivotal position of the lever (80) includes a pin (51) mounted for sliding movement relative to the pressure plate (13). The pin (51) contacts the lever and is inhibited from sliding movement towards the flywheel to prevent pivotal movement of the lever towards the flywheel but is able to slide in a direction away from the flywheel as the clutch wears to adjust the angular position of the lever. Due to the lever ratio the pin (51) slides by an amount which is less than the amount of wear.

33 Claims, 9 Drawing Sheets

FRICTION CLUTCH WITH WEAR ADJUSTMENT AND CONSTANT LIFT DEVICE

The present invention relates to self adjusting friction clutches and friction clutches.

Friction clutches are known which comprise a clutch cover attached to a flywheel with at least one spring acting on a pressure plate to force a driven plate into frictional engagement with the flywheel.

It is also known for friction clutches to have a constant lift device which limits movement of the pressure plate away from the flywheel during disengagement of the clutch to a substantially constant distance throughout the life of the clutch.

It is an object of the present invention to provide an improved form of constant lift device which is more compact than heretofore known constant lift devices, and in particular, more compact in an axial direction when considering the rotational axis of the clutch.

Thus according to the present invention there is provided a self adjusting friction clutch comprising a clutch cover, a pressure plate rotationally fast with the cover but axially displaceable towards a driven plate by spring means so that the driven plate is clamped between the pressure plate and an associated flywheel to engage the clutch, an adjustment device to compensate for wear in the clutch, at least part of the adjustment device being located in the force path between the spring means and the pressure plate, and at least one constant lift device to limit lift of the pressure plate during clutch disengagement such that the bias force of the spring means acting on the adjustment device is reduced when the clutch is substantially fully disengaged to assist operation of the adjustment device, characterised in that the or each constant lift device comprises a lever pivotally connected to one of the pressure plate or an axially fixed component of the clutch and which lever during disengagement of the clutch contacts, at a point remote from the pivot, an abutment on the other of the pressure plate or the axially fixed component to limit lift of the pressure plate, and means to control the angular position of the lever with respect to the said one of the pressure plate or the axially fixed component to maintain the lift of the pressure plate substantially constant over the life of the clutch, the adjustment device and the constant lift device thus co-operating to maintain the clamp load of the spring means substantially constant as the clutch wears.

According to a further aspect of the present invention there is provided a friction clutch comprising a cover attached to a flywheel with at least one spring capable of acting to bias a pressure plate into frictional engagement with a driven plate, the driven plate in turn being biased into frictional engagement with the flywheel, and at least one constant lift device mounted on one of the pressure plate or an anally fixed component of the clutch, each constant lift device comprising a first abutment for contact with a further abutment on the other of the pressure plate or axially fixed component to limit lift of the pressure plate during clutch disengagement, the position of the first abutment relative to said one of the pressure plate or axially fixed component being adjustable in response to wear of the friction surfaces of the driven plate so as to maintain the lift of the pressure plate during disengagement of the clutch substantially constant, characterized in that the constant lift mechanism comprises a lever pivotally connected to said one of the pressure plate or axially fixed component, the lever carrying the first abutment at a point remote from the pivotal connection, and means to control the angle of the lever, the control means comprising a pin slidable relative to said one of the pressure plate or axially fixed component in response to wear, the arrangement being such that the amount by which the pin slides is different from the corresponding amount of wear of the driven plate According to a further aspect of the present invention there is provided friction clutch comprising a clutch cover attached to a flywheel with at least one spring means capable of acting to bias a pressure plate into frictional engagement with a driven plate, the driven plate in turn being biased into frictional engagement with the flywheel, and at least one constant lift device acting to limit lift of the pressure plate during clutch disengagement to a substantially constant value and being mounted on one of the pressure plate or an axially fixed component, the or each constant lift device including a pin slidable relative to said one of the pressure plate or axially fixed component to permit adjustment of the constant lift device in response to wear of the friction surfaces of the clutch, characterised in that a force is applied to the pin which is dependent upon the speed of rotation of the clutch, and which force is operative to prevent adjustment of the constant lift device above a predetermined speed of rotation of the clutch.

The invention will now be described by way of example only with reference to the accompanying drawings in which.

Figure 1:
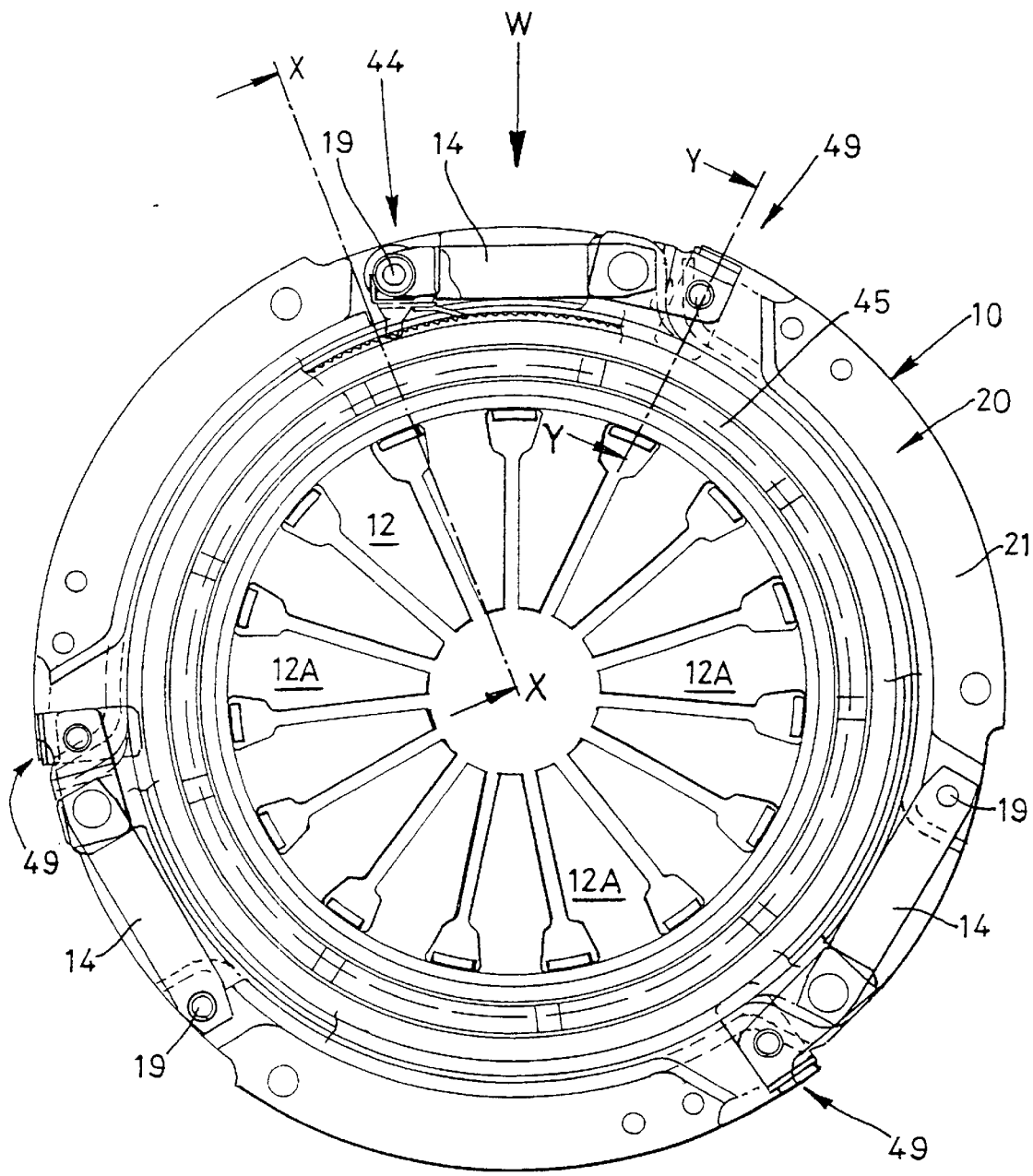
FIG. 1 is an axial cut away view of a clutch assembly according to the present invention.
Figure 2:
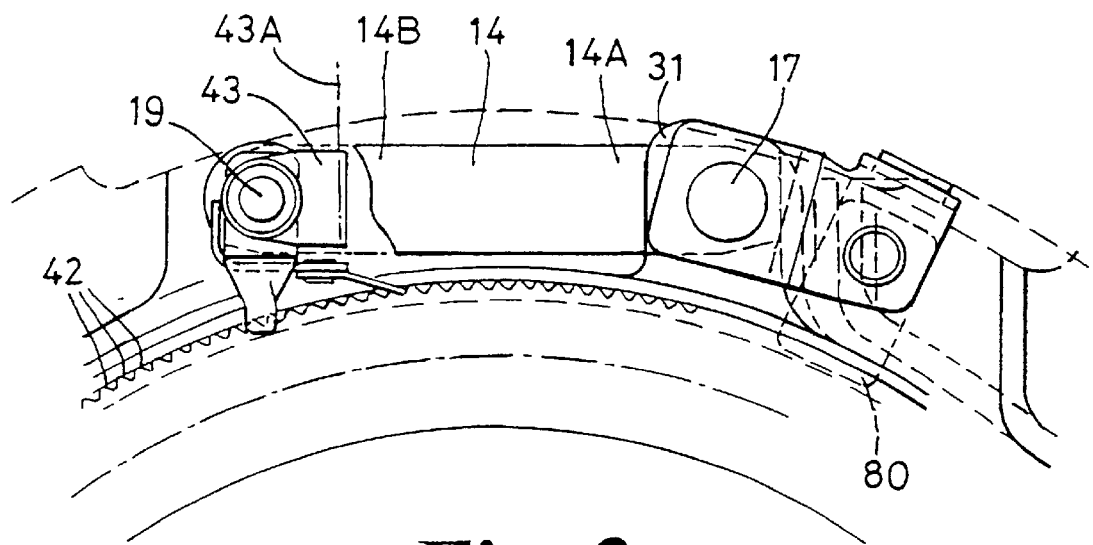
FIG. 2 is an enlarged view of part of FIG. 1.
Figure 3:
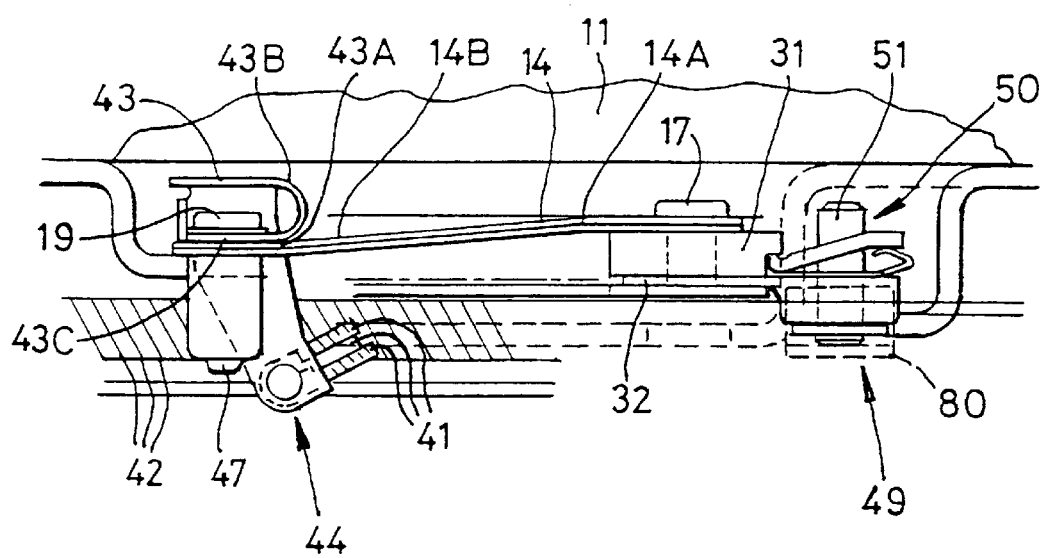
FIG. 3 is a radial view of FIG. 1 taken from the direction of arrow W
Figure 4:
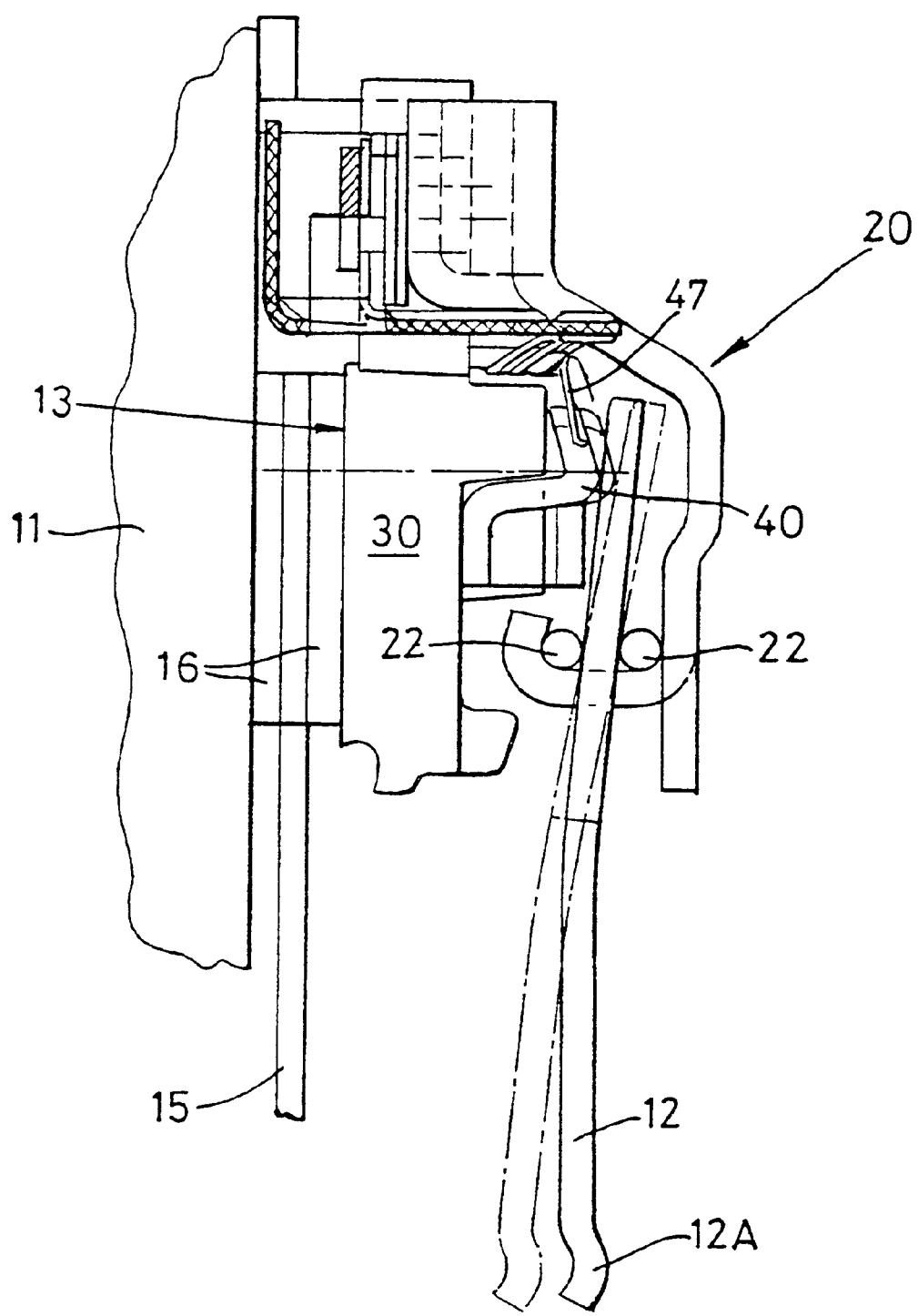
FIG. 4 is a partial cross section view of the clutch cover assembly.
Figure 7:
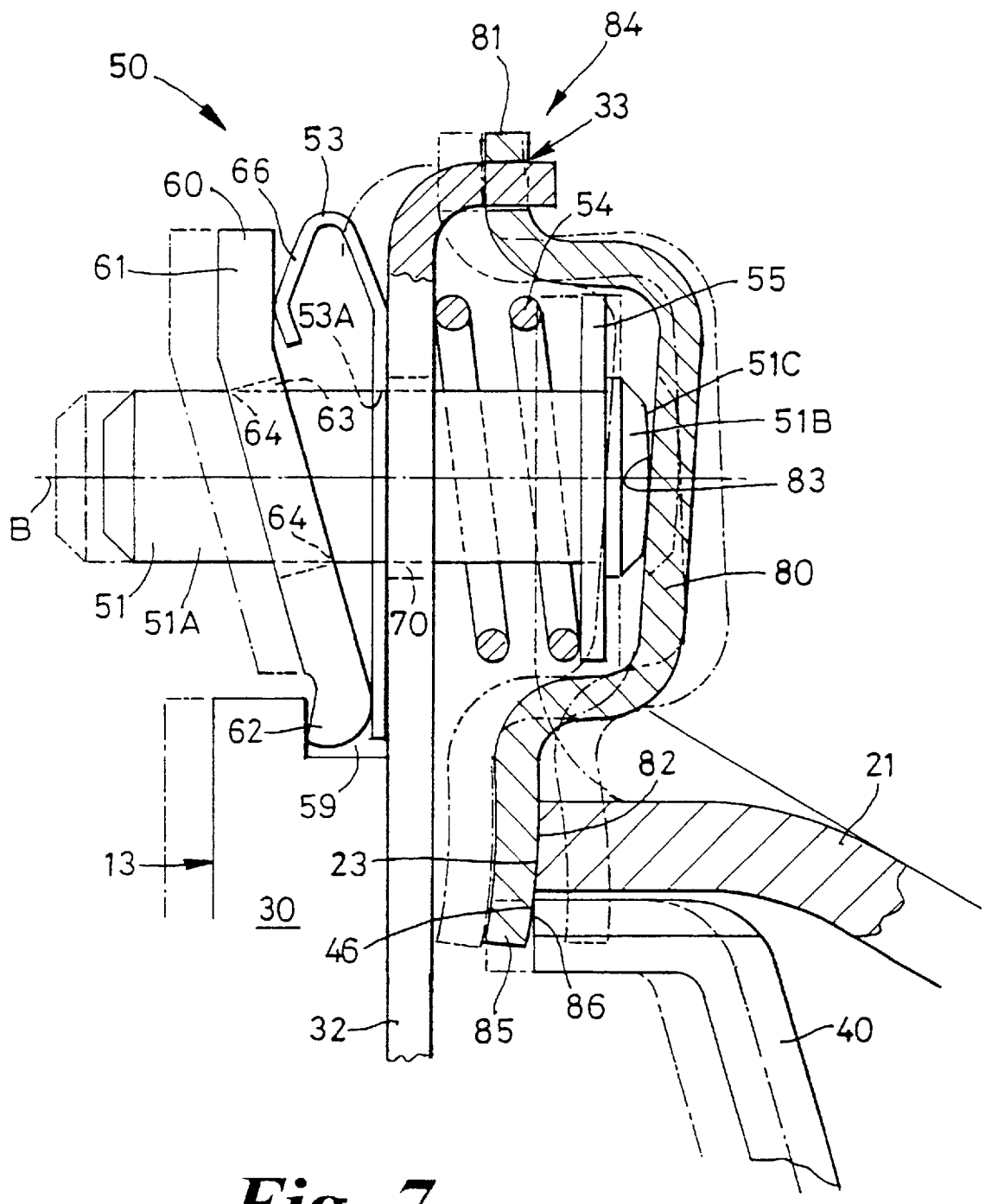

FIG. 7 is a cross sectional view taken along the line Y—Y of FIG. 1 with components 60, 53 and 59 shown rotated through 90 degrees for clarity.

Figure 5:
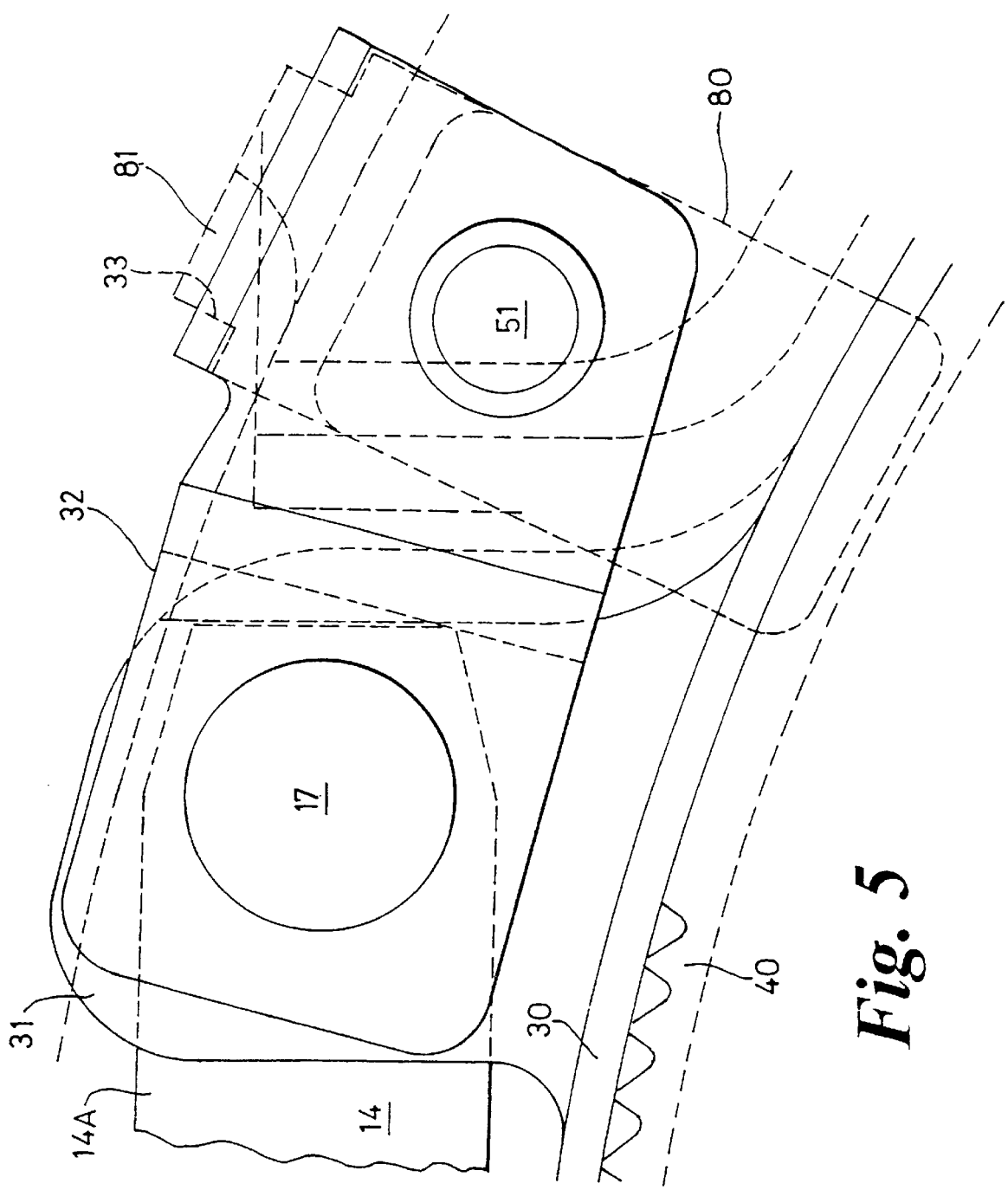
FIG. 5 is an enlarged view of part of FIG. 1.
Figure 6:
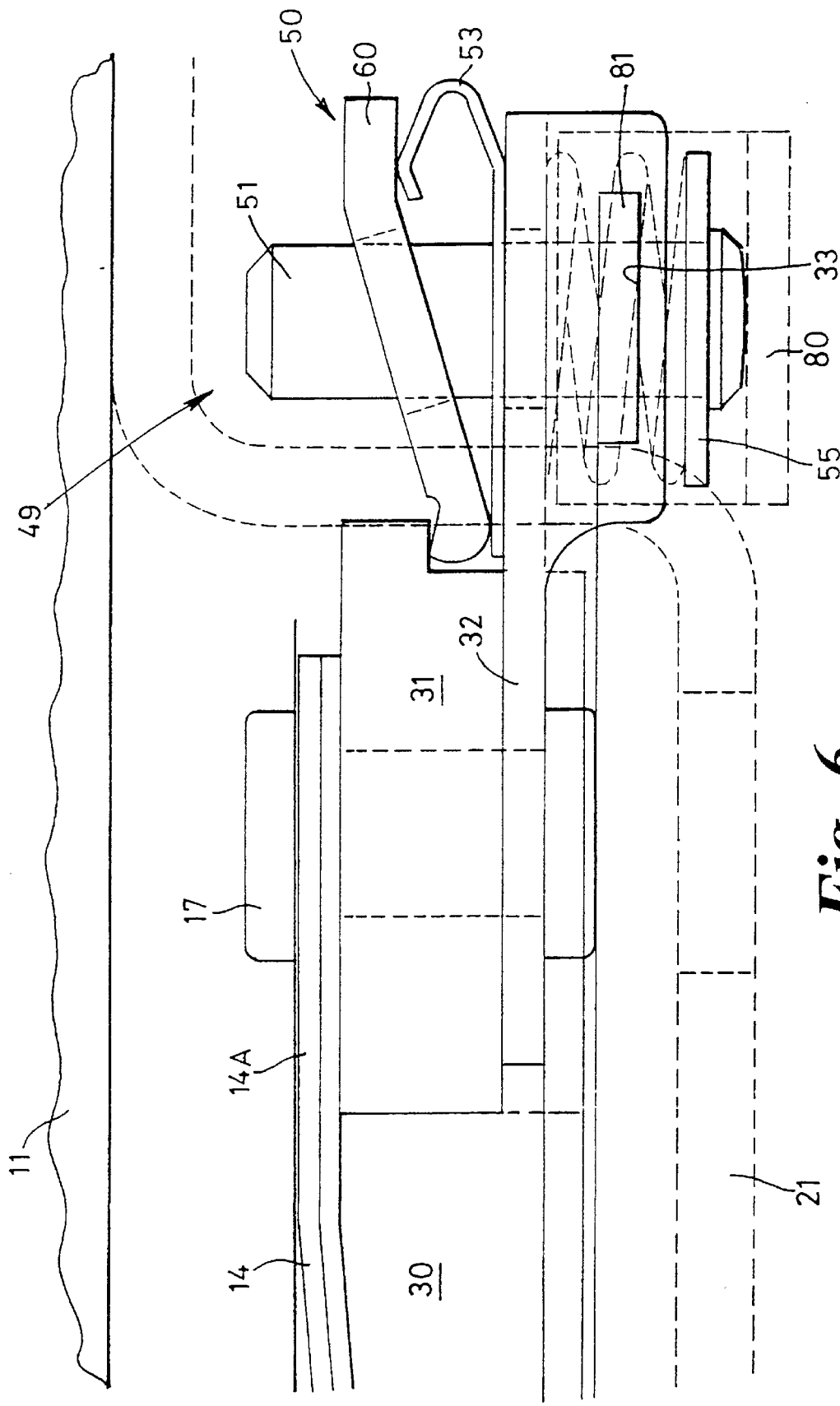
FIG. 6 is an enlarged view of part of FIG. 3.
Figure 8:
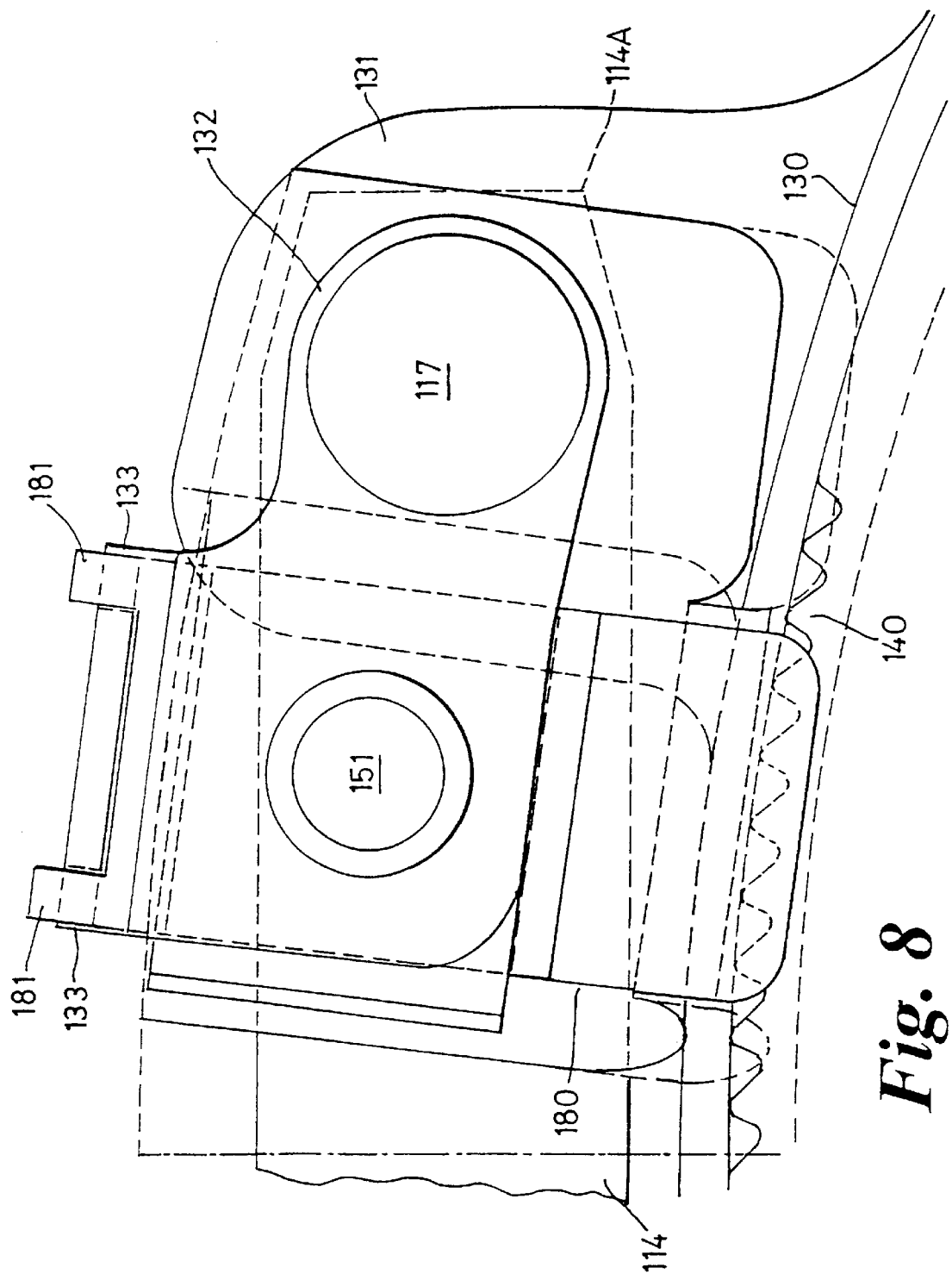
Figure 9:
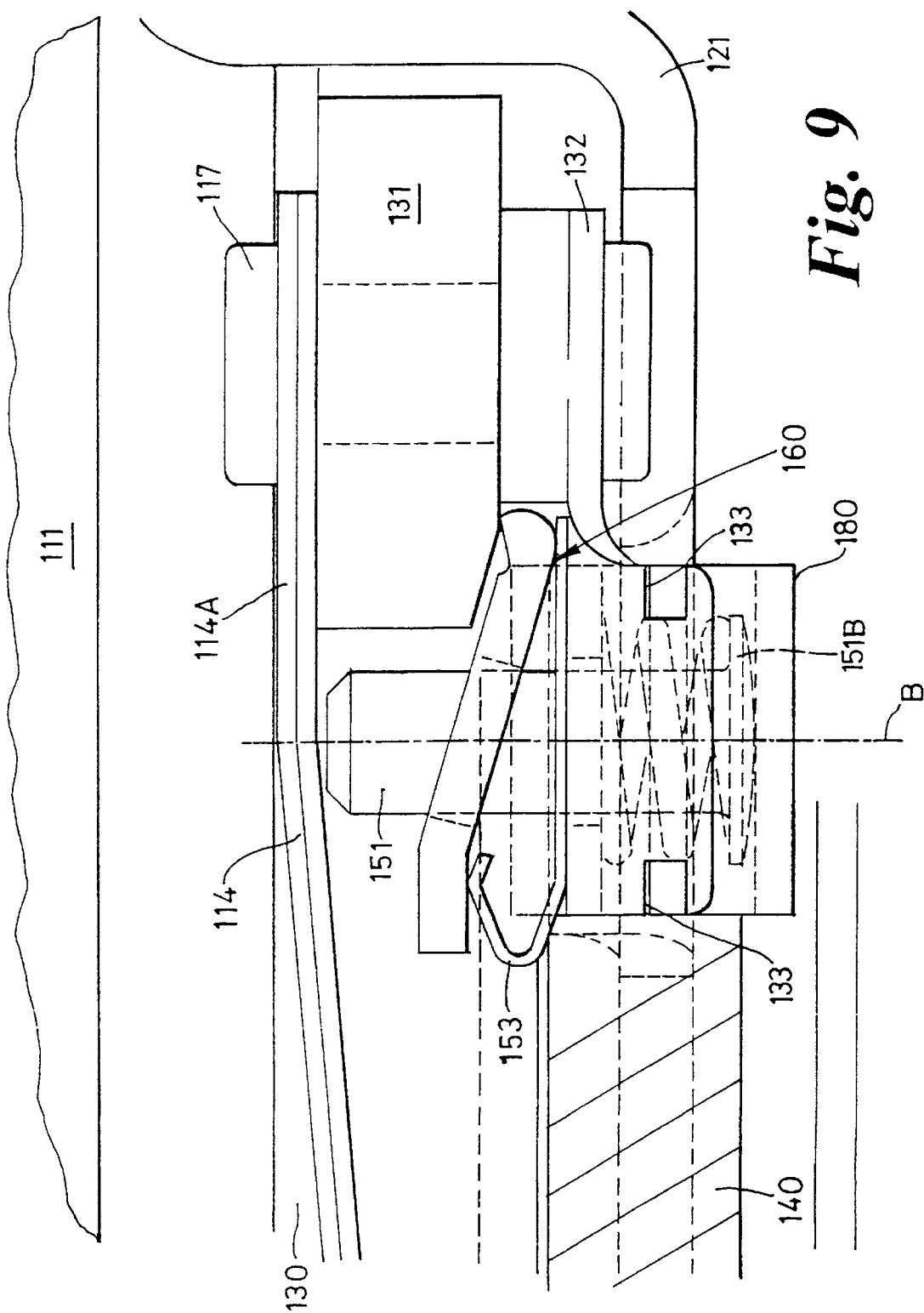
Figure 10:
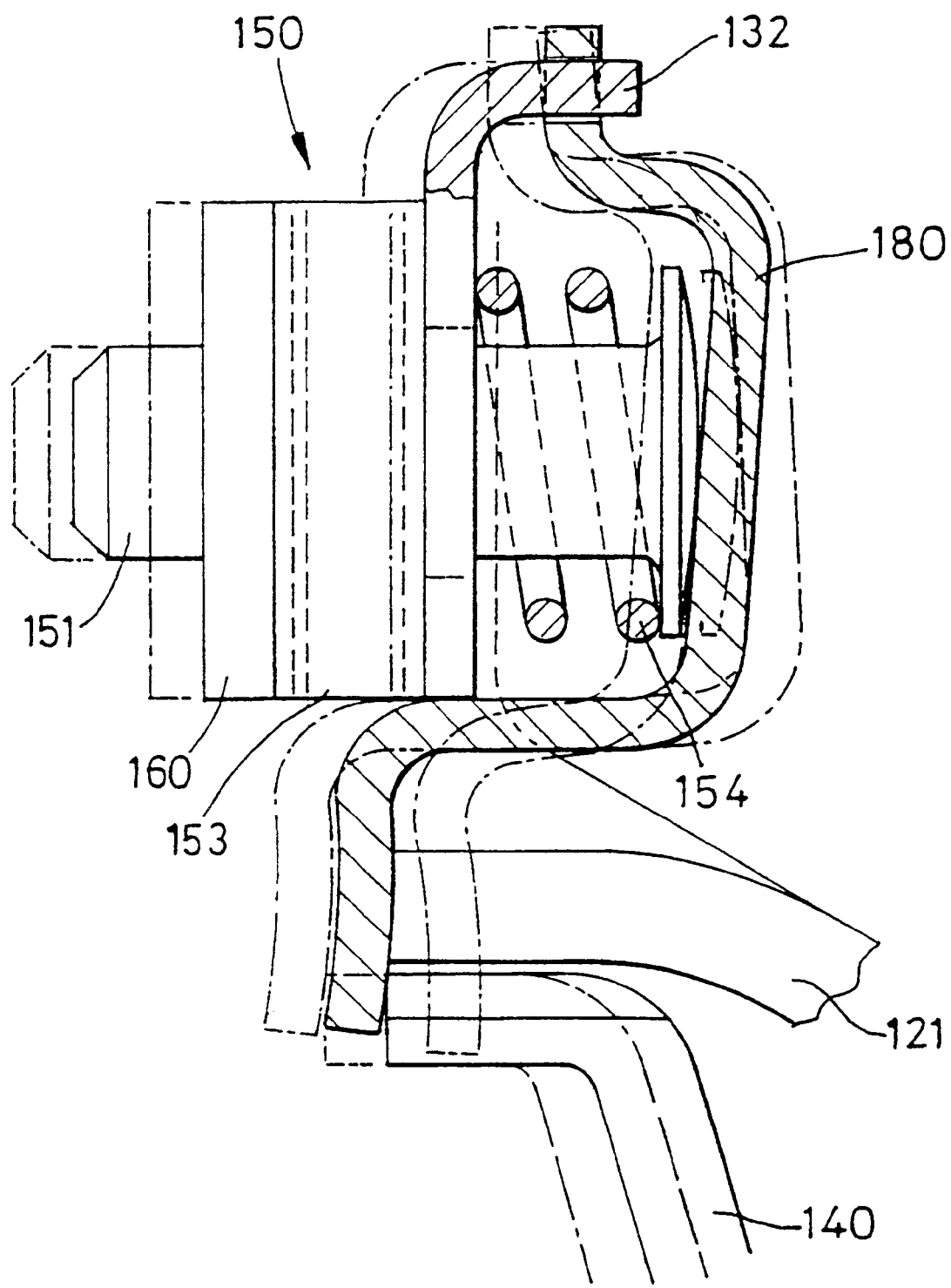

FIGS. 8, 9 and 10 are equivalent views to FIGS. 5, 6 and 7 respectively of a second embodiment of the invention.

With reference to FIGS. 1 to 7 there is illustrated a clutch 10 which includes a flywheel 11, a clutch cover assembly 20 and a driven plate 15. The flywheel is fixed to the end of a crank shaft (not shown) of an associated internal combustion engine. In this case the clutch is an automatically adjusting clutch.

The clutch cover assembly 20 comprises a clutch cover 21, a diagram spring 12, a pressure plate 13, lift straps 14, one adjuster mechanism 44 and three constant lift devices 49. Each constant lift device 49 comprising a lever 80 and means to control the angular position of the lever with respect to the pressure plate. The control means comprising a one-way self-locking mechanism 50 and adjustment means (54, 46 & 86).

The clutch cover 21 is fixed rotationally and axially fast to the flywheel 11 by bolts (not shown) and supports the diaphragm spring 12 via two support rings 22 situated one on each axial side of the diaphragm spring 12. The diaphragm spring biases the pressure plate 13 towards the flywheel 11. The clutch driven plate 15 is situated between the pressure plate 13 and flywheel 11 and is connected to the input shaft of a gearbox (not shown). When the clutch is engaged i.e. when the diaphragm spring 12 biases the pressure plate 13 towards the flywheel, clamping the driven plate 15, power can be transmitted between the associated engine and gearbox.

By applying an axial force to the fingers 12A of the diaphragm spring 12 in a direction towards the flywheel 11 the clutch can be disengaged in a known manner.

The pressure plate 13 comprises a first part 30 coaxial with a second part in the form of a pivot ring 40. First part 30 is generally annular in shape and has significant thermal mass and is thus capable of absorbing heat generated by frictional contact with the adjacent friction facing 16 of the driven plate 15 during engagement and disengagement of the clutch 10. On the radially outer periphery of the first part 30 there are three circumferentially equi-spaced lugs 31. Fixed to each lug by a rivet 17 is one end 14A of a tangentially orientated lift strap 14. The other end 14B of the strap 14 is fixed to the clutch cover 21 by a rivet 19. The straps 14 ensure the first part 30 remains concentric with and rotationally fast with the clutch cover 21 but allow axial movement of the first part 30 relative to the clutch cover 21. When the clutch is engaged the straps are stressed and bias the first part 30 away from the flywheel. This biassing assists in separating the first part 30 from the driven plate 15 when the clutch is disengaged.

Adjuster mechanism 44 forms part of an adjustment device arranged to compensate for wear in the clutch including in particular wear of the friction facings of the driven plate. For a full, explanation of the operation of the adjustment device see the applicant's co-pending International Application PCT/GB96/02280. However in summary the operation is as follows:

Following a sufficient amount of wear of the clutch driven plate friction facings 16, one of the pawl teeth 41 mounted on the cover 21 via spring 43 will move over the top of the helical tooth 42 it is resting on (which are formed in ring 40) and be biassed into the valley between the helical tooth 42 and an adjacent helical tooth. On subsequent disengagement, the axial movement of the second part of the pressure plate and hence the helical tooth 42 biases the pawl tooth 41 away from the flywheel. However the pawl tooth is constrained to move in an arc by spring 43 which deforms about an axis 43A on a curved portion 43B of the spring adjacent a flat portion 43C which is fixed to the cover 21 by rivet 19. When the clamp load between spring 12 and pivot ring 40 is sufficiently low, the energy stored in the spring 43 is sufficient to cause the pawl tooth 41 acting on the helical teeth 42 to rotate the second part 40 of the pressure plate relative to the first part 30 about axis A. The first and second parts of the pressure plate have facing ramps and as relative rotation occurs the effective thickness of the pressure plate increases to compensate for the reduction in thickness of the driven plate friction facing 16.

Each constant lift device 49 is attached to an associated lug 31 of first part 30 of the pressure plate 13 and are all identical, therefore only one will be described in detail.

With reference to FIG. 7, constant lift device 49 comprises a one-way self locking mechanism 50 having an adjustment pin 51, a locking plate 60, and a locking spring 53. The constant lift device also comprises an adjusting spring 54, and a washer 55. In FIG. 7 components 60, 59 and 53 have been rotated through 90 degrees in this view for ease of explanation.

Adjustment pin 51 comprises a shank portion 51A and a head portion 51B with a domed abutment surface 51C.

Spring 53 has a central hole 53 which is a clearance fit on the adjustment pin 51 and also has a tab 66 bent through approximately 180 degrees in the shape of a "U". It is the resilience of the material that causes the U-shape portion of the spring 53 to act as a spring and bias the locking plate 60 (see below) away from the head 51B of the adjustment pin 51.

Locking plate 60 is mounted via a central hole 63 on adjustment pin 51 and is of generally rectangular shape with a tab 61 which is biassed away from the head 51B by spring 53. The locking plate 60 is restrained from moving away from the head 51B because a second tab 62 remote from tab 61, is situated in a slot 59 of the first part 30. This causes the locking plate 60 to tip sufficiently such that edges 64 of the locking plate 60 contact the pin 51.

The adjustment pin 51 is mounted in a hole 70 of a tab 32 with head 51B positioned on the side of tab 32 remote from the flywheel. Tab 32 is secured to first part 30 by rivet 17. Situated between the head 51B and the hole 70 is spring 54 which is retained on the adjustment pin 51 by washer 55. Spring 54 is tensioned such that it biases the adjustment pin 51 to the right when viewing FIG. 7, and when there is no restraining force applied to the lever 80, moves the adjustment pin 51 to the right when viewing FIG. 7. However when the lever 80 applies a force to the head 51B to the left when viewing FIG. 7 the edges 64 of locking plate 60 firmly engage shank portion 51A and no movement of adjustment pin 51 is possible towards the flywheel (ie. movement to the left when viewing FIG. 7). Thus, in use, the adjustment pin 51 can only move relative to first part 30 in a direction away from the flywheel and is blocked from moving relative to first part 30 in a direction towards the flywheel.

Lever 80 is formed from a generally rectangular sheet metal component with four substantially 90 degree bends resulting in a "top hat" cross section. One end of lever 80 is formed as a tongue 81 which engages in a slot 33 of tab 32. At the other end of lever 80 there is a first abutment 82. It can be seen from FIG. 7 that this abutment has a curved profile, the relevance of which will be described below. The mid portion of lever 80, where contacted by head 51B is known as a fifth abutment 83. Note that the radial distance between the pivot and the first abutment is greater than the distance between the pivot and the fifth abutment.

Operation of one of the constant lift devices 49 is as follows (the operation of the other constant lift devices being identical):

1) With a new clutch and unworn driven plate and with the clutch engaged, the spring 54 biasses the head 51B (also known as a sixth abutment) into engagement with the fifth abutment 83 of the lever 80, resulting in a turning moment being applied to the lever 80 about pivot 84. This turning moment is resisted by tab 85 contacting pivot ring 40 which acts as a restraint to prevent the lever 80 from pivoting in an anticlockwise direction as viewed in FIG. 7. Pivot ring 40 is prevented from moving away from the flywheel because it is biassed towards the flywheel, as described above, by the diaphragm spring 12 which is considerably stronger than the combined forces produced by the springs 54 and lift straps 14.

2) When the clutch is disengaged the lift straps 14 move the pressure plate 13 and constant lift devices 49 away from the flywheel ultimately resulting in first abutment 82 contacting an axially fixed second abutment 23, in this case a portion of the clutch cover 21 (see FIG. 7). Further movement of the first part 30 of pressure plate 13 away from the flywheel is thereby prevented. However the pivot ring 40 is only restricted from moving further away from the flywheel by the relatively light retaining force provided by retaining spring 47 and also by the relative position of the diaphragm spring.

3) Re-engagement of the clutch causes the components to return to their pre-disengagement position.

However following wear of the friction facings 16 the operation of the constant lift device is as follows:

1. With the clutch engaged the wear results in one of the pawl teeth 41 moving over a corresponding helical tooth 42 as described above.

2. Disengagement of the clutch causes the pressure plate 13 and constant lift device to move away from the flywheel with the first abutment 82 of the lever ultimately contacting the second abutment 23 on the clutch cover (as described above in relation to an unworn clutch).

3. Further movement of the diaphragm fingers 12A of the diaphragm spring 12 towards the flywheel results in the pivot ring 40 no longer being clamped between the diaphragm spring and the first part 30 of the pressure plate 13. At this stage the spring load in spring 43 causes the pivot ring 40 to rotate slightly relative to the clutch 10 resulting in an increase in the effective thickness of the pressure plate as a result of relative movement of the ramps 45 thus adjusting for the wear of the friction facings 16. This also results in a gap appearing between the third abutment 86 on lever 80 and the restraint, otherwise known as a fourth abutment 46 on pivot ring 40. In essence the gap acts to sense that wear of the friction facings in present and that adjustment of the constant lift device is required.

4. During re-engagement of the clutch the pivot ring 40, first part 30 and tab 32 move towards the flywheel in unison. However the first abutment 82 of the lever 80 is biassed against the second abutment 23 by the spring 54 acting through the adjustment pin 51 which causes the lever 80 to pivot about pivot 84 until the gap created between the third abutment 86 of lever 80 and the fourth abutment 46 of pivot ring 40 (caused by the increase in the effective thickness of the pressure plate) is closed.

5. Further engagement of the clutch causes the pressure plate and, constant lift device all to move in unison towards the flywheel until full engagement is achieved.

It should be noted that the one-way self-locking mechanism 50 allows the lever 80 to pivot anticlockwise when viewing FIG. 7 but does not allow any subsequent clockwise pivoting of the lever 80 about pivot 84 due to the operation of the shank 51A, locking plate 60 and spring 53. Also the perpendicular distance from the adjustment pin axis B to the pivot 84 is, in general terms roughly equal to the perpendicular distance from axis B to the first abutment 82. This gives a 1:2 lever ratio between movements of the fifth and first abutments.

The object of a self-adjusting clutch is to maintain the diaphragm spring 12 with a fixed cone angle when the clutch is engaged, at all stages of clutch wear so that the clamp load remains constant. In this case this results in a requirement that the pivot ring 40 also be maintained in a fixed axial position, when the clutch is engaged, at all stages of clutch wear.

Wear of say one millimetre thickness of the clutch driven plate friction facings 16 causes the pressure plate 13 to move towards the flywheel by a corresponding one millimetre amount. Following the adjustment sequence as described above, this results in first abutment 82 moving away from the first part 30 by a corresponding one millimetre. However due to the lever ratio resulting from the relative positions of pivot 84, fifth abutment 83 and first abutment 82, the adjustment pin 51 only moves by approximately half that amount i.e. half a millimetre.

Thus the axial space envelope required for pin 51 is reduced by an amount equal to (in this case) half the wear allowance on friction facings 16 when compared with an equivalent pin that adjusts by an amount equal to the wear on the friction facings.

The domed abutment surface 51C results in the adjustment pin head 51B contacting the lever 80 in substantially the same position at whatever the state of wear of the clutch driven plate friction facings, the state of wear defining the angular position of lever 80. Similarly the curved surface of the first abutment 82 results in the second abutment surface 23 and fourth abutment surface 46 being substantially axially aligned when the biassed load of spring 54 is transferred between these components during clutch engagement or dis-engagement.

FIGS. 8 to 10 show a second embodiment of a clutch 110 with features that fulfil the same function as clutch 10 being labelled one hundred greater, significant differences are as follows;

a) Pin 151 has an integrally formed head 151B of diameter substantially equal to the external diameter of spring 154. Thus no additional washer equivalent to washer 55 is required.

b) The one-way self-locking mechanism 150 and lever 180 are positioned between the ends of 114A and 114B of lift strap 114. In this case it is particularly advantageous to employ a lever ratio such that movement of the adjustment pin 151 is less than the equivalent wear of the clutch driven plate friction facings since under these circumstances the design allows for a particularly axially compact design in an area where space is limited by the lift strap 114.

c) The lever 180 is provided with two tongues 181 which engage in corresponding open ended slots 133 of tab 132.

The axis B of adjustment pins 51 and 151 is not restricted to being parallel to the axis A of the clutch. Thus in further embodiments the axis B could be at an angle to or radially disposed relative to the axis A of the clutch. With a radially disposed adjustment pin centrifugal force loadings can be used to resist or assist movement of the adjustment pin in the adjustment direction. In particular centrifugal forces can be used to restrict adjustment of the clutch above a predetermined speed such as an engine idle speed.

Also the arrangement of lever 80, 180 can be changed so that the pivot on the pressure plate is generally in the centre of the lever with one end of the lever acted on by pin 51, 151 and the other end of the lever acted on the cover 21, 121 and the second part 40, 140 of the pressure plate. Such an arrangement would give a 1:1 lever ratio with the movement of the pin 51, 151 being equal to the wear of the friction facing 16.

The constant lift device is not restricted to being mounted on the pressure plate. For example it could be mounted on an anally fixed component of the clutch for example the clutch cover and the first abutment of the lever could be arranged to advance towards the flywheel as wear occurred.

What is claimed is:

1. A self adjusting friction clutch comprising a clutch cover (21), a pressure plate (13) rotationally fast with the cover but axially displaceable towards a driven plate (15) by spring means (12) so that the driven plate is clamped between the pressure plate and an associated flywheel (11) to engage the clutch, an adjustment device (30, 40, 44) to compensate for wear in the clutch, at least part (30, 40) of the adjustment device being located in the force path between the spring means and the pressure plate, and, at least one constant lift device (49) to limit lift of the pressure plate during clutch disengagement such that the bias force of the spring means acting on the adjustment device is reduced when the clutch is substantially full disengaged to assist operation of the adjustment device, characterised in that said at least one constant lift device comprises a lever (80) pivotally connected to one of the pressure plate or an axially fixed component of the clutch and where the lever during disengagement of the clutch contacts, at a point (86) remote from a pivot (84), an abutment (23) on the other of the pressure plate or the anally fixed component to limit lift of the pressure plate, and means (46, 50, 54, 86) to control the angular position of the lever with respect to the said one of the pressure plate or the anally fixed component to maintain the lift of the pressure plate substantially constant over the life of the clutch, the adjustment device and the constant lift device thus co-operating to maintain the clamp load of the spring means substantially constant as the clutch wears.

2. A self adjusting friction clutch as claimed in claim 1 in which the control means comprises a one-way self-locking mechanism (50) for preventing pivotal movement of the lever in a first direction and adjustment means (46, 54, 86) for controlling pivotal movement of the lever in a second direction.

3. A self adjusting friction clutch as claimed in claim 2 in which the adjustment means comprises bias means (54) for biasing the lever in the second direction and a restraint (46). which contacts the lever to limit pivotal movement in the second direction.

4. A self adjusting friction clutch as claimed in claim 3 in which the axial position of the restraint is adjustable in response to wear in the clutch.

5. A self adjusting friction clutch as claimed in claim 4 in which the axial position of the restraint is adjusted by the adjustment device in response to wear in the clutch.

6. A self adjusting friction clutch as claimed in claim 3 in which, with the clutch engaged, the restraint remains substantially in the same axial position relative to the flywheel, independent of the state of wear of the clutch.

7. A self adjusting friction clutch as claimed in claim 2 in which the one-way self-locking mechanism comprises a pin (51) mounted for sliding movement relative to said one of the pressure plate or the axially fixed component and carrying a further abutment (51C) which contacts the lever at a point (83) remote from the pivot (84), the pin being inhibited from sliding movement in one direction to prevent pivotal movement of the lever in the first direction but being capable of movement in the opposite direction to permit pivotal movement lever in the second pivotal direction.

8. A self adjusting friction clutch as claimed in claim 7 in which the ratio of the distances between the pivot (84) and the further abutment (51C) carried by the pin and the pivot (84) and the abutment (23) on the other of the pressure plate or the axially fixed component is such that the amount by which the pin slides differs from the amount of wear in the clutch.

9. A self adjusting friction clutch as claimed in claim 7 in which the pin slides less than the corresponding wear in the clutch.

10. A self adjusting friction clutch as claimed in claim 4 in which the pressure plate comprises a first part (30) and a second part (40), the second part being capable of anal movement relative to the first part to increase the effective axial thickness of the pressure plate to compensate for wear in the clutch.

11. A self adjusting friction clutch as claimed in claim 10 in which the restraint (46) is axially fast with the second part (40).

12. A self adjusting friction clutch as claimed in claim 7 in which the lever has a "top hat" profile such that the further abutment (51C) carried by the pin contacts the lever in a plane which is displaced to one side of a line joining the pivot (84) and the abutment (23) on the other of the pressure plate or the axially fixed component.

13. A self adjusting friction clutch as claimed claim 1 in which at least one of the abutment (23) on the other of the pressure plate or the axially fixed component or the lever where it is contacted by said abutment is curved to maintain a substantially constant lever ratio.

14. A self adjusting friction clutch as claimed in claim 3 in which at least one of the restraint (46) or the lever where it is contacted by the restraint is curved to maintain a substantially constant lever ratio.

15. A self adjusting friction clutch as claimed in claim 7 in which at least one of the further abutment (51C) carried by the pin or the lever where it is contacted by said abutment is curved to maintain a substantially constant lever ratio.

16. A self adjusting friction clutch as claimed in claim 7 in which the line of action between the further abutment (23) on the other of the pressure plate or the axially fixed component and the lever is not parallel to the line of action between the abutment (51C) carried by the pin and the lever.

17. A self adjusting friction clutch as claimed in claim 16 in which the lever is cranked.

18. A self adjusting friction clutch as claimed in claim 1 which the pivot comprises at least one tongue on said one of the pressure plate or the axially fixed component which is received in a corresponding slot in the lever.

19. A self adjusting friction clutch as claimed in claim 1 in which the pivot comprises at least one tongue (81) on the lever which is received in a corresponding slot (33) of the said one of the pressure plate or axially fixed component.

20. A self adjusting friction clutch as defined in claim 7 in which a force is applied between the pin and the lever which is dependent upon centrifugal loading, which force is operative to prevent adjustment of the constant lift device above a predetermined rotational speed of the clutch.

21. A self adjusting friction clutch as claimed in claim 7 in which a line joining the pivot (84) and the abutment (23) on the other of the pressure plate and the axially fixed component is substantially perpendicular to the direction of movement of the pin.

22. A self adjusting friction clutch as defined in claim 7 in which the pin slides in a direction parallel to the rotational axis of the clutch.

23. A self adjusting friction clutch as defined in claims 7 in which the pin slides at an angle relative to the rotational axis of the clutch.

24. A self adjusting friction clutch as defined in claims 7 in which the pin slides in a direction which is substantially radially disposed relative to the rotational axis of the clutch.

25. A self adjusting clutch or a friction clutch as defined in claim 23 in which centrifugal forces acting on the pin resist movement of the pin in the adjustment direction so that the constant lift device is prevented from adjusting above a pre-determined speed of rotation of the clutch.

26. A self adjusting clutch as defined in claim 7 in which the adjustment device is rendered inoperative above the pre-determined speed of rotation of the clutch as a consequence of the constant lift device being prevented from adjusting.

27. A friction clutch comprising cover (21) attached to a flywheel (11) with at least one spring (12) capable of acting to bias a pressure plate (13) into frictional engagement with a driven plate (15), the driven plate in turn being biased into fictional engagement with the flywheel, and at lea one constant lift device (49) mounted on one of the pressure plate or an axially fixed component of the clutch, each constant lift device comprising a first abutment (82) for contact with a further abutment (23) on the other of the pressure plate or an axially fixed component to limit lift of the pressure plate during clutch disengagement, the position of the first abutment relative to said one of the pressure plate or axially fixed component being adjustable in response to wear of the friction surfaces of the driven plate so as to maintain the lift of the pressure plate during disengagement of the clutch substantially constant characterised in that the constant lift mechanism comprises a lever (80) with a pivotal connection to said one of the pressure plate or an axially fixed component, the lever carrying the first abutment (82) at a point remote from the pivotal connection, and means (46, 86, 50, 54) to control the angle of the lever, the control means comprising a pin (51) slidable relative to said one of the pressure plate or an axially fixed component in response to wear, the arrangement being such that the amount by which the pin slides is different from the corresponding amount of wear of the driven plate.

28. A friction clutch as defined in claim 27 in which the amount by which the pin slides during an adjustment differs by more than 10% and preferably by more than 30% of the corresponding amount of wear.

29. A friction clutch as defined in claim 27 in which the pin slides by an amount which is less than the corresponding amount of wear.

30. A friction clutch as defined in claim 27 in which the pin slides by an amount which is more than the corresponding amount of wear.

31. A friction clutch comprising a clutch cover (21) attached to a flywheel (11) with at least on spring means (12) capable of acting to bias a pressure plate (13) into frictional engagement with a driven plate (15), the driven plate in turn being biased into frictional engagement with the flywheel, and, at least one constant lift device (49) acting to limit lift of the pressure plate during clutch disengagement to a substantially constant value and being mounted on one of the pressure plate or an axially fixed component, said at least one constant lift device including a pin (51) slidable relative to said one of the pressure plate or an axially fixed component to permit adjustment of the constant lift device in response to wear of the friction surfaces of the clutch, characterized in that a force applied to the pin which is dependent upon the speed of rotation of the clutch, and which force is operative to prevent adjustment of the constant lift device above a pre-determined speed of rotation of the clutch.

32. A friction clutch as defined in claim 31 further comprising an adjustment device (30, 40, 44) to compensate for wear in the clutch, in which operation of the adjustment device is blocked as a result of adjustment of the constant lift device being prevented above a pre-determined speed of rotation of the clutch.

33. A friction clutch as defined in claim 31 in which the pin (51) is radially disposed relative to the rotational axis of the clutch.

* * * * *